United States Patent
Kim et al.

(10) Patent No.: US 11,560,091 B2
(45) Date of Patent: Jan. 24, 2023

(54) NIGHT VISION DISPLAY DEVICE

(71) Applicant: LG ELECTRONICS INC., Seoul (KR)

(72) Inventors: Kwanhyung Kim, Seoul (KR); Hyunjoon Kim, Seoul (KR); Sangguel Oh, Seoul (KR); Dongryeol Lee, Seoul (KR); Salkmann Ji, Seoul (KR); Samnyol Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1078 days.

(21) Appl. No.: 16/309,371

(22) PCT Filed: Jun. 13, 2017

(86) PCT No.: PCT/KR2017/006157
§ 371 (c)(1),
(2) Date: Dec. 12, 2018

(87) PCT Pub. No.: WO2017/217745
PCT Pub. Date: Dec. 21, 2017

(65) Prior Publication Data
US 2019/0187290 A1    Jun. 20, 2019

Related U.S. Application Data

(60) Provisional application No. 62/349,134, filed on Jun. 13, 2016.

(30) Foreign Application Priority Data

Jun. 13, 2017 (KR) .................. 10-2017-0074250

(51) Int. Cl.
*B60R 1/00* (2022.01)
*G01S 17/894* (2020.01)
(Continued)

(52) U.S. Cl.
CPC .............. *B60R 1/00* (2013.01); *G01S 7/4861* (2013.01); *G01S 7/4865* (2013.01); *G01S 17/08* (2013.01);
(Continued)

(58) Field of Classification Search
CPC ................ B60R 1/00; B60R 2300/106; B60R 2300/303; G01S 17/08; G01S 17/10;
(Continued)

(56) References Cited

U.S. PATENT DOCUMENTS

| 10,830,891 B2 * | 11/2020 | Kwon .................... B60W 50/14 |
| 2005/0220450 A1 * | 10/2005 | Enomoto ................ G01S 17/08 |
| | | 348/E7.086 |
| 2007/0057209 A1 * | 3/2007 | Kurihara ............... G01S 7/4914 |
| | | 250/559.38 |
| 2015/0144790 A1 | 5/2015 | Velichko et al. |

(Continued)

FOREIGN PATENT DOCUMENTS

| CN | 105991933 A * 10/2016 ........... B60Q 1/1423 |
| EP | 1 376 154 A1    1/2004 |

(Continued)

*Primary Examiner* — Christopher S Kelley
*Assistant Examiner* — Kathleen M Walsh
(74) *Attorney, Agent, or Firm* — Birch, Stewart Kolasch & Birch, LLP

(57) ABSTRACT

Provided is a night vision output device comprising: an optical pulse output unit for outputting pulsed light at specific periods; a photographing unit having an image sensor for forming a plurality of images by using pulsed light reflected by an external object; a display unit for outputting a final image formed by synthesizing the plurality of images; and a control unit for calculating distance information of an object displayed in each pixel by using data of a brightness ratio for a distance and a brightness ratio for each pixel of the final image, wherein, in one frame, the control unit controls the image sensor such that the image sensor is activated while having different delay times on the basis of an output termination time of the pulsed light.

11 Claims, 6 Drawing Sheets

(51) Int. Cl.
  *G01S 7/4865* (2020.01)
  *H04N 5/225* (2006.01)
  *H04N 5/232* (2006.01)
  *G01S 17/10* (2020.01)
  *H04N 5/44* (2011.01)
  *G01S 7/4861* (2020.01)
  *G01S 17/08* (2006.01)
  *G01S 17/931* (2020.01)

(52) U.S. Cl.
  CPC ............ *G01S 17/10* (2013.01); *G01S 17/894* (2020.01); *H04N 5/2256* (2013.01); *H04N 5/23293* (2013.01); *H04N 5/44* (2013.01); *B60R 2300/106* (2013.01); *B60R 2300/303* (2013.01); *G01S 17/931* (2020.01)

(58) Field of Classification Search
  CPC .... G01S 17/894; G01S 17/931; G01S 7/4861; G01S 7/4865; H04N 5/2256; H04N 5/23293
  USPC ........................................................ 356/5.01
  See application file for complete search history.

(56) References Cited

U.S. PATENT DOCUMENTS

| | | | |
|---|---|---|---|
| 2015/0285623 A1* | 10/2015 | Tachibana | G01B 11/14 250/341.8 |
| 2015/0292884 A1* | 10/2015 | Fuchikami | H04N 5/2256 348/135 |
| 2016/0377708 A1* | 12/2016 | Lou | G01S 17/08 348/221.1 |
| 2017/0234976 A1* | 8/2017 | Grauer | G01S 7/483 356/5.04 |
| 2019/0004150 A1* | 1/2019 | Mano | G01S 7/4868 |

FOREIGN PATENT DOCUMENTS

| | | | | |
|---|---|---|---|---|
| EP | 1376154 A1 | * | 1/2004 | ........... B60Q 1/1423 |
| EP | 3395636 A1 | | 10/2018 | |
| JP | 2008181711 A | * | 8/2008 | |
| KR | 10-0778904 B1 | | 11/2007 | |
| KR | 100778904 B1 | * | 11/2007 | |
| KR | 10-2012-0000299 A | | 1/2012 | |
| KR | 10-2015-0086901 A | | 7/2015 | |
| KR | 10-2016-0061132 A | | 5/2016 | |

* cited by examiner $S\_min = T\_d * C/2$
$S1 = S\_min + min(T\_p, T\_s) * C/2$
$S2 = S\_min + max(T\_p, T\_S) * C/2$
$S\_max = (T\_p + T\_d + T\_s) * C/2$

NIGHT VISION DISPLAY DEVICE

CROSS REFERENCE TO RELATED APPLICATIONS

This application is the National Phase of PCT International Application No. PCT/KR2017/006157, filed on Jun. 13, 2017, which claims priority under 35 U.S.C. 119(e) to U.S. Provisional Application No. 62/349,134, filed on Jun. 13, 2016 and under 35 U.S.C. 119(a) to Patent Application No. 10-2017-0074250, filed in the Republic of Korea on Jun. 13, 2017, all of which are hereby expressly incorporated by reference into the present application.

TECHNICAL FIELD

The present invention relates to a night vision display device for a vehicle, with improved visibility of a distant object.

BACKGROUND ART

A night vision display device (a night vision output device or a night vision device) for a vehicle is a device for assisting a driver during night driving or in bad weather such as snowing/raining. The night vision display device also serves to transfer a situation or condition within a specific distance to the vehicle through visual data.

However, in case of a night vision display device including general sensors and light lamps, when an output time of light is increased in order to detect an object located at a long distance, it is difficult to secure a clear image due to an increase in noise caused by external light.

DETAILED DESCRIPTION OF THE DISCLOSURE

The present invention is to obviate the problem and other drawbacks, and an aspect of the present invention is to provide a night vision output device having an improved measurable distance while minimizing noise, and a night vision or night image processing method thereof.

To achieve the aspect and other advantages of the present invention, there is provided a night vision display device, including an optical pulse output unit to output pulsed light at specific periods, a photographing unit provided with an image sensor forming a plurality of images using pulsed light reflected by an external object, a display unit to output a final image obtained by synthesizing the plurality of images, and a control unit to calculate distance information related to an object displayed in each pixel by using data related to a brightness ratio of each pixel of the final image and a brightness ratio for a distance, wherein the control unit controls the image sensor to be activated with different delay times based on an output end time of the pulsed light in one frame.

In one embodiment of the present invention, the control unit may calculate distance data using a brightness ratio of light received with first and third delay times and data of the brightness ratio, and calculate distance data using a brightness ratio of light received with second and fourth delay times and data of the brightness ratio. Therefore, data of a farther distance can be obtained even without increasing an output time width of an optical pulse (pulsed light).

In one embodiment of the present invention, the photographing unit may include first and second image sensors configured as a TOF image sensor. The control unit may control the first and second image sensors to simultaneously receive light with first and third delay times, respectively, during a first frame, and control the photographing unit to simultaneously receive light with second and fourth delay times during a second frame.

Effects of the Disclosure

According to the present invention, an image sensor whose activation time is controllable can be activated to have different delay times with respect to an output time width of pulsed light, thereby calculating distance data according to a brightness ratio of light received.

Also, the image sensor can be controlled to have second and fourth delay times, and thus a farther distance can be detected using the image sensor. Therefore, a measurement distance can be extended even without increasing an output time width of pulsed light. This may result in minimizing an introduction of external light, thereby forming a clearer image.

BRIEF DESCRIPTION OF THE DRAWINGS

FIG. 3C is a graph showing a quantity of light received by first and third light receiving patterns.

BEST MODE FOR CARRYING OUT PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1A:
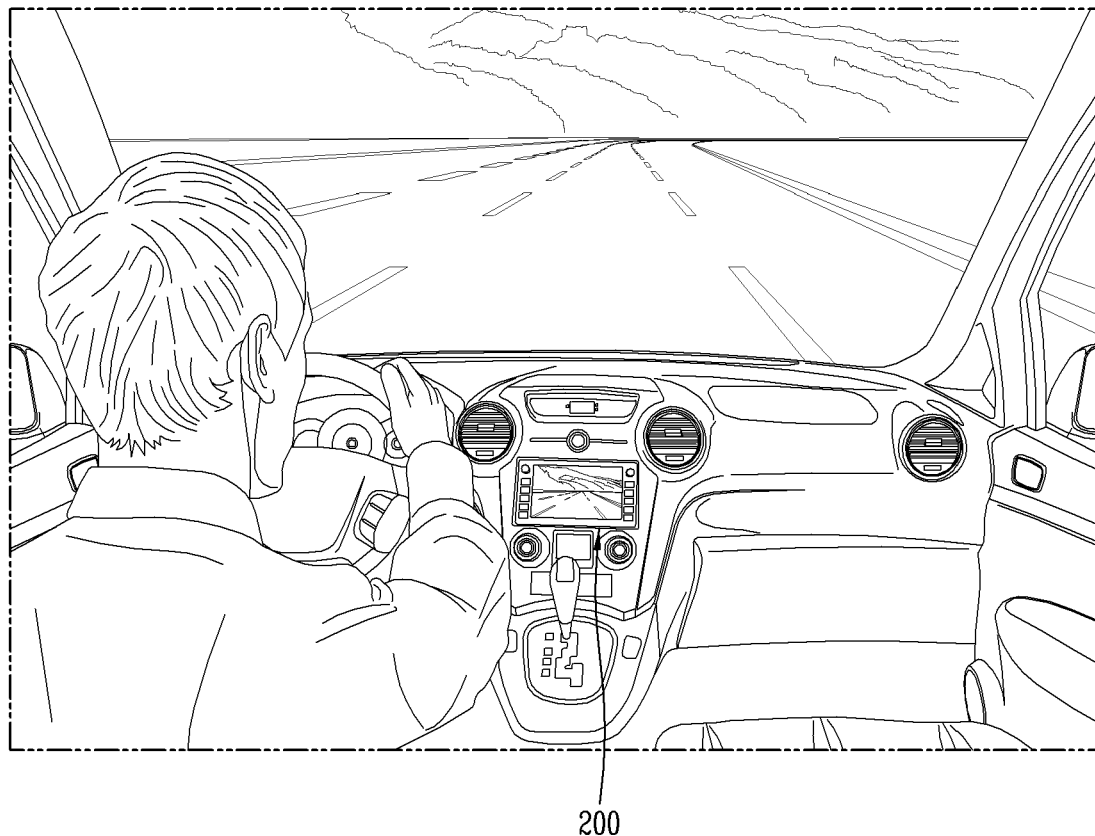
FIG. 1A is a conceptual view illustrating an example of a night vision display device mounted on a vehicle.
Figure 1B:
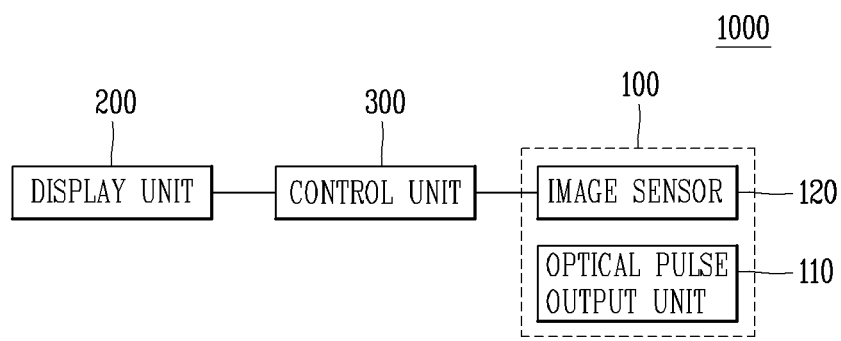
FIG. 1B is a block diagram illustrating components of a night vision display device according to one embodiment of the present invention.

FIG. 1A is a conceptual view illustrating one embodiment of a night vision display device mounted on a vehicle, and FIG. 1B is a block diagram illustrating components of a night vision display device according to one embodiment of the present invention.

A display unit 200 of a night vision display device according to one embodiment of the present invention is preferably arranged so that a driver of a vehicle can see an image thereon while viewing the front.

Referring to FIG. 1B, the night vision display device includes a photographing unit (or capturing unit) 100 for photographing (or capturing) an image, a display unit 200 for outputting an image, and a control unit (or controller) 300. The photographing unit 100 includes an optical pulse output unit 110 and an image sensor 120. When an optical pulse is generated by the optical pulse output unit 110, the optical pulse is reflected on an object disposed in front of the vehicle so as to reach the image sensor 120. The image sensor 120 forms an image for detecting a distance from the object using an incident optical pulse.

Figure 2:
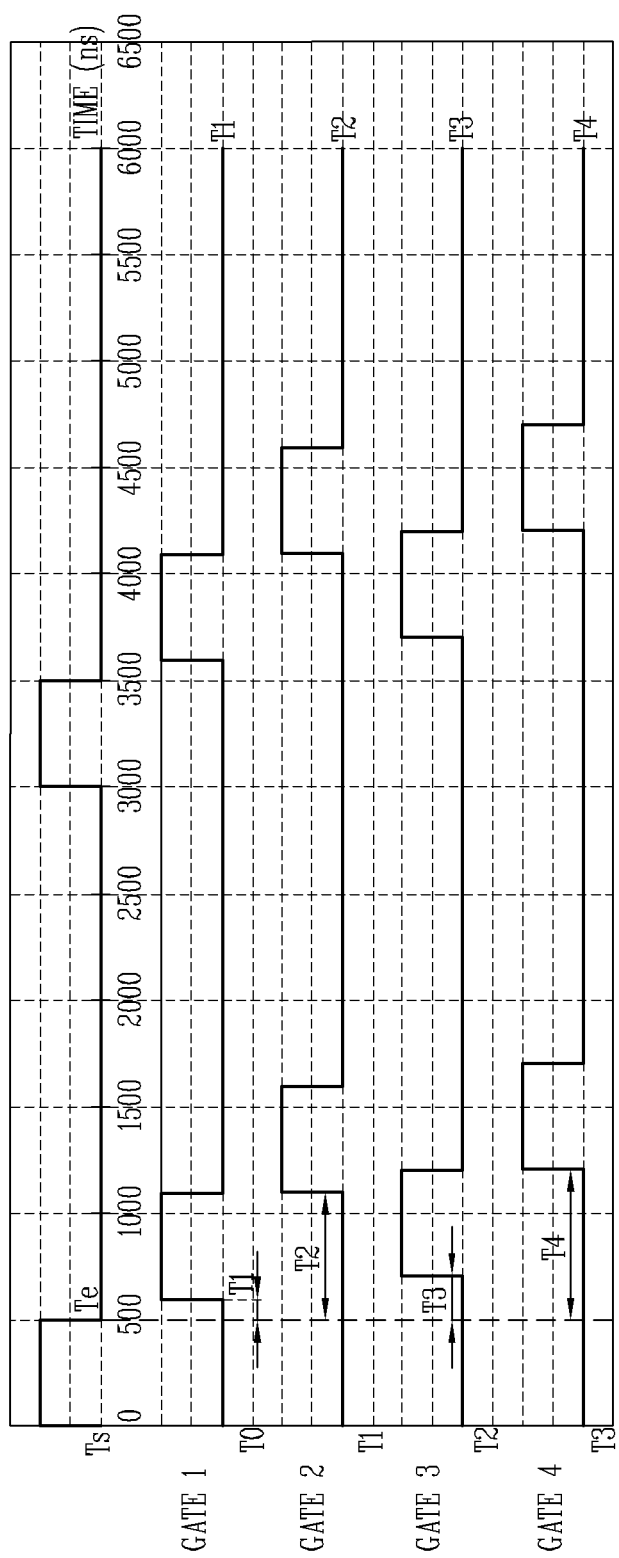
FIG. 2 is a conceptual view illustrating a method of controlling an image sensor and an optical pulse output unit in accordance with one embodiment of the present invention.

FIG. 2 is a conceptual view illustrating a method of controlling an image sensor and an optical pulse output unit in accordance with one embodiment of the present invention.

Referring to FIG. 2, the optical pulse output unit 110 outputs light for a specific time at a specific period. The light output from the optical pulse output unit 110 is reflected by objects located at different distances and is received by the image sensor 120. The specific period and the specific time at and for which light is output from the optical pulse output unit 110 may be set differently depending on a range of a distance for securing distance data. As a pulse width of the output light increases, a distance that can be measured by one pulsed light increases. However, as the pulse width increases, an inflow amount of external light increases, which causes an increase in noise.

The image sensor 120 is activated after a specific time is delayed from a time to at which the output of light from the optical pulse output unit 110 is terminated, and then receives light. The image sensor 120 is controlled to be activated later by first to fourth delay times t1, t2, t3 and t4 according to a lapse of time.

The optical pulse output unit 110 outputs light from a start time ts to an end time te and the image sensor 120 collects light which arrives thereat after a first delay time t1 has elapsed from the end time te. During the first delay time t1, the light output from the optical pulse output unit 110 reaches an object and is reflected by the object to reach the image sensor 120. An output time width of the light of the optical pulse output unit 110 is substantially the same as an activation time width of the image sensor 120 or the activation time width of the image sensor 120 may be set to be longer than the output time width of the optical pulse output unit 110.

While the optical pulse output unit 110 continuously outputs optical pulses at a specific period, the image sensor 120 is activated by a first light receiving pattern in a delayed state by the first delay time t1 from the end time te a preset number of times (N1 times), and then receives light.

After the image sensor 120 is activated by the first light receiving pattern N1 times, the image sensor 120 is activated by the second light receiving pattern N2 times. The image sensor 120 is activated after being delayed by a second delay time t2 from the end time te. A time width in which the image sensor 120 is activated is substantially the same as a time width of the first light receiving pattern. The second delay time t2 may be set to be longer than the first delay time t1. For example, the first delay time t1 may be 100 ns and the second delay time t2 may be 600 ns.

On the other hand, when the image sensor 120 is repeatedly activated N2 times, the image sensor 120 is activated by the third light receiving pattern N3 times. The image sensor 120 is activated at a time delayed by a third delay time t3 from the end time te. The third delay time t3 is longer than the first delay time t1 and shorter than the second delay time t2, and the third delay time t3 may be about 200 ns.

The control unit 300 may acquire distance data of an object using light received by the image sensor 120 according to the first and third light receiving patterns.

Meanwhile, after the image sensor 120 is activated by the third light receiving pattern N3 times, the image sensor 120 is activated by a fourth light receiving pattern N4 times so as to receive light reflected from the object. The fourth light receiving pattern is activated as long as a specific time width at a time point delayed by a fourth delay time t4 from the end time te.

The control unit 300 generates distance data of the object using light received by the image sensor 120 according to the second and fourth light receiving patterns. By using light received as the image sensor 120 is activated by the second and fourth light receiving patterns, distance data of an object located at a farther distance can be acquired even without increasing an output time width of pulsed light.

That is, according to the present invention, when the image sensor 120 receives sequentially reflected light by the first to fourth light receiving patterns while pulsed light is output at the same period, the control unit 300 calculates a distance using a brightness ratio of light received by the first to third light receiving patterns. A distance to the object to be acquired using the brightness ratio is set by a difference between the first and third delay times t1 and t3. The distance data acquired by the brightness ratio of light received by the second and fourth light receiving patterns may overlap a brightness ratio of light received by the first and third light receiving patterns, and a range of the distance data by the second and fourth light receiving patterns may be set by a difference between the second and fourth delay times t2 and t4. Images each made of a plurality of frames are stored in one memory by the image sensor 120 activated by the first to fourth light receiving patterns.

The image sensor according to these embodiments may be a gated image sensor. The gated image sensor can support up to 120 fps. In addition, the gated image sensor may control different delay times to be set in one frame. The gated image sensor can be controlled to receive light by the first and second light receiving patterns in a separate manner. Therefore, a distance range that can be calculated by a brightness ratio of received light can be extended.

When the gated image sensor is used in a night vision display device, three out of four sensor outputs are used for image capturing, and one is used for distance measurement.

Hereinafter, a method of acquiring distance data using the first to fourth light receiving patterns will be described.

Figure 3A:
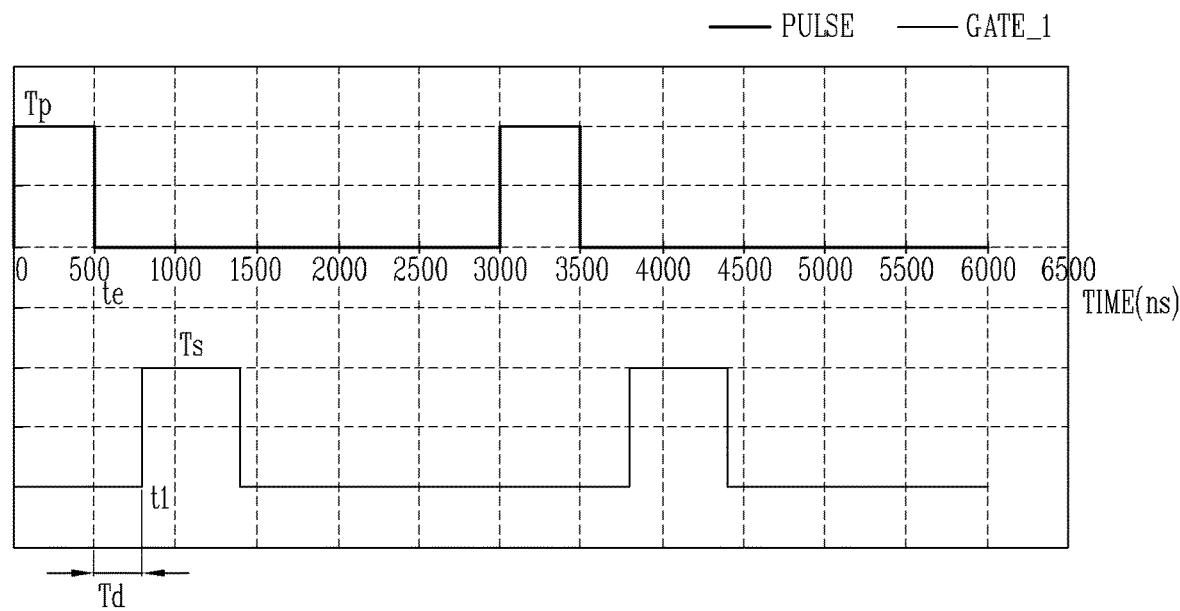
FIG. 3A is a graph showing a quantity of light according to distances of first and third light receiving patterns.
Figure 3B:
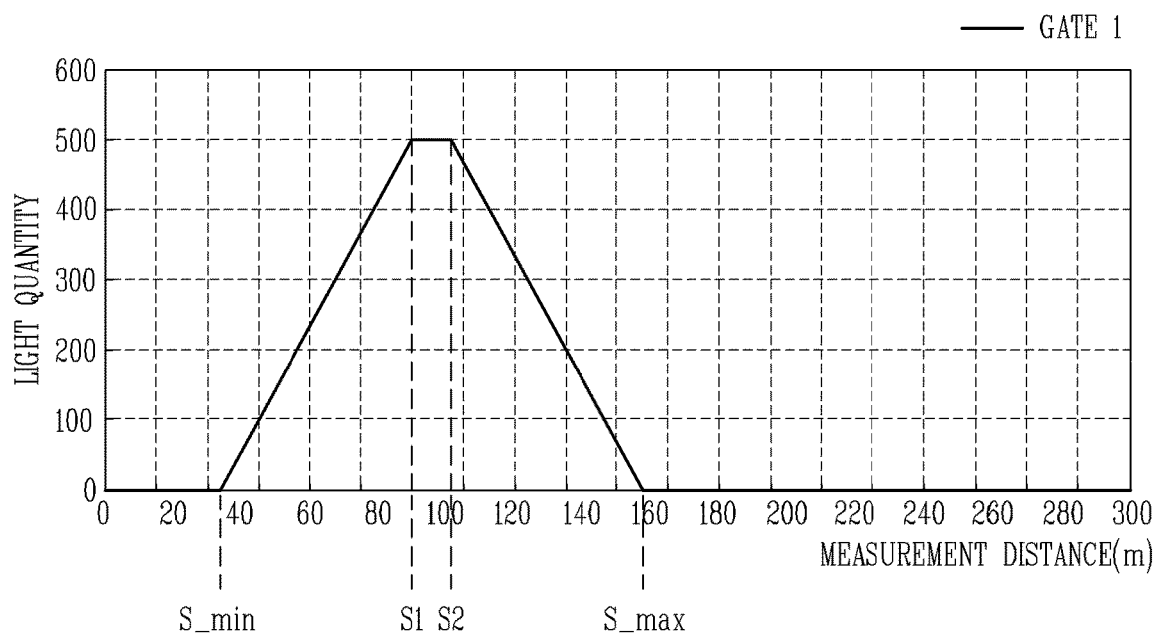
FIGS. 3B and 3C are graphs showing a quantity of light according to a delay time and a distance.
Figure 3C:
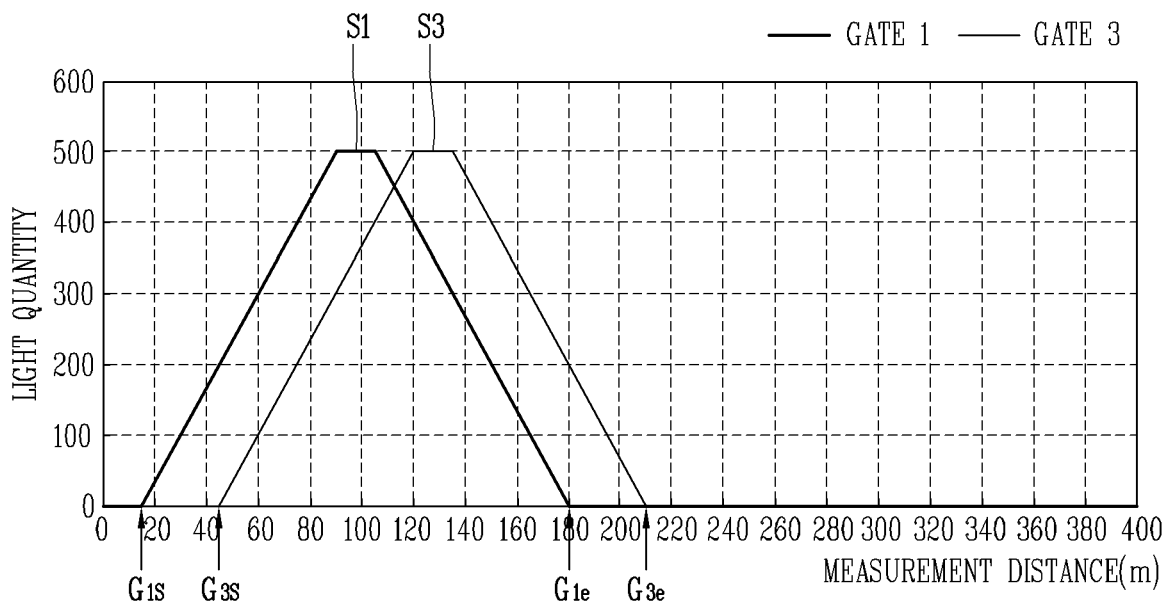

FIG. 3A is a graph showing a quantity of light according to distances of first and third light receiving patterns, and FIGS. 3B and 3C are graphs showing a quantity of light according to a delay time and a distance.

FIG. 3A shows a comparison between the first light receiving pattern and an output pattern of pulsed light, and FIG. 3B is a conceptual view illustrating changes in a quantity of light according to the first light receiving pattern.

Referring to FIG. 3A, Tp denotes a time width of the pulsed light, Ts denotes an activation time width of the first light receiving pattern, and Td denotes a delay time between an end time to of the pulsed light and a start time t1 of the first light receiving pattern.

Referring to FIG. 3B, brightness of light received by the image sensor 120 which is activated according to the first light receiving pattern is gradually increased, starting from a specific start point S_min, and temporarily maintained. Such brightness of the light is then gradually decreased until reaching a specific end point S_max. In the graph of FIG. 3B, distance data on a horizontal axis has values of the delay time Td, the pulse width Tp of the pulsed light, and the activation time width Ts of the first light receiving pattern, which may be calculated by the following Equations 1 to 4.

Referring to Equation 1, a distance at which light first arrives is calculated by multiplying a delay time by a half value of speed of light. After the light first arrives, output one pulsed light is continuously reflected and incident, and thus a quantity of light gradually increases.

Referring to Equations 2 and 3, a distance (distance between S1 and S2) where the quantity of light is kept constant is not formed when a time width T_p at which the pulsed light is output and a time width T_s at which the image sensor is activated are the same as each other.

After the quantity of light reaches the maximum quantity, the quantity of light gradually decreases until the time width T_p at which the pulsed light is output and the time width T_s at which the sensor is activated are all passed. Referring to Equation 4, a distance at a time point without a quantity of light is a value obtained by multiplying the sum of the time width T_p at which the pulsed light is output, the time width T_s at which the sensor is activated and the delay time by the half value of the speed of light.

$$S\_min = T\_d * C/2 \quad \text{[Equation 1]}$$

$$S1 = S\_min + \min(T\_p, T\_s) * C/2 \quad \text{[Equation 2]}$$

$$S2 = S\_min + \max(T\_p, T\_S) * C/2 \quad \text{[Equation 3]}$$

$$S\_max = (T\_p + T\_d^{-1} + T\_s) * C/2 \quad \text{[Equation 4]}$$

Accordingly, the control unit 300 can obtain a light quantity value corresponding to each distance according to the first to fourth equations, and the image sensor 120 can form an image corresponding to each distance using the acquired light quantity value.

FIG. 3C is a graph showing a quantity of light received by the first and third light receiving patterns.

Referring to FIG. 3C, a difference between the first and third delay times is set to satisfy the graph of FIG. 3C.

The graph shows changes in a quantity of light of the first and third light receiving patterns with respect to an output time point of one pulsed light. Here, a start point and an end point represent distances corresponding to a time point at which the light quantity is measured and a time point at which the light quantity is not measured. A start point G3s of the third light receiving pattern is farther than a start point G1s of the first light receiving pattern and is closer than an end point G1e of the first light receiving pattern. An end point G3e of the third light receiving pattern is farther than or equal to the end point G1e of the first light receiving pattern.

In addition, time widths for activating the image sensor in the first and third light receiving patterns may be different from each other. However, such time widths are set such that a last point S1 at which a predetermined greatest quantity of light is received in the first light-receiving pattern is closer than or equal to a start point S3 at which a predetermined greatest quantity of light is received in the third light-receiving pattern. That is, some of light received by the first and third light receiving patterns correspond to light reflected by objects located at distances overlapping each other.

The control unit 300 calculates a distance using a brightness ratio based on prestored reference data.

Figure 4A:
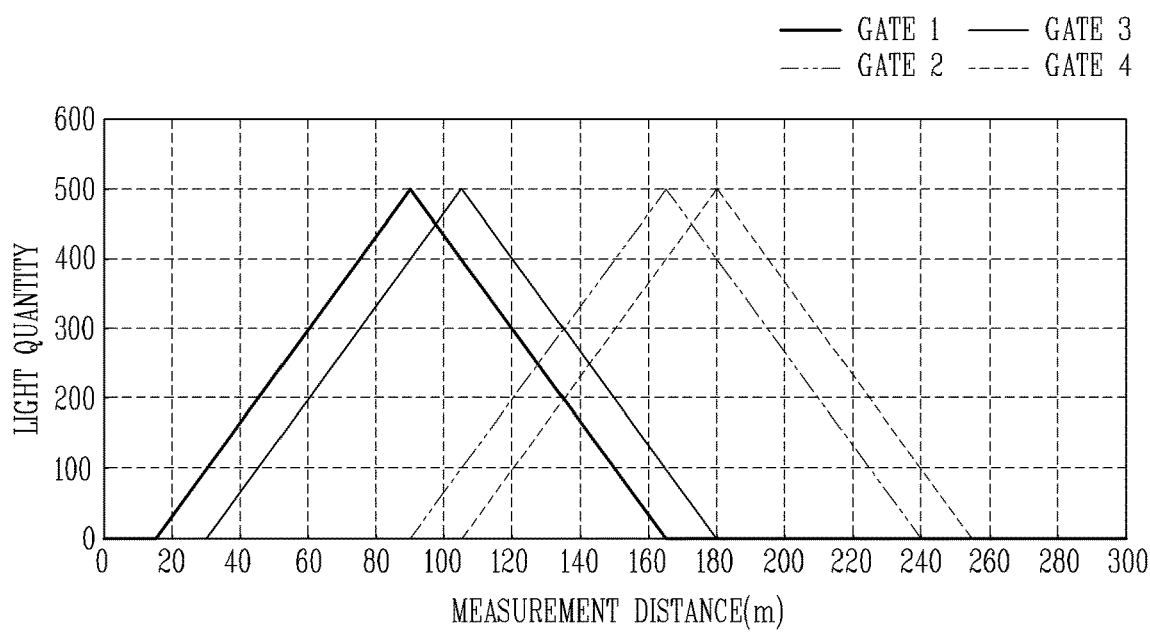
FIG. 4A is a graph showing a quantity of light according to a distance for comparing a quantity of light of first and third light receiving patterns with a quantity of light of second and fourth light receiving patterns.
Figure 4B:
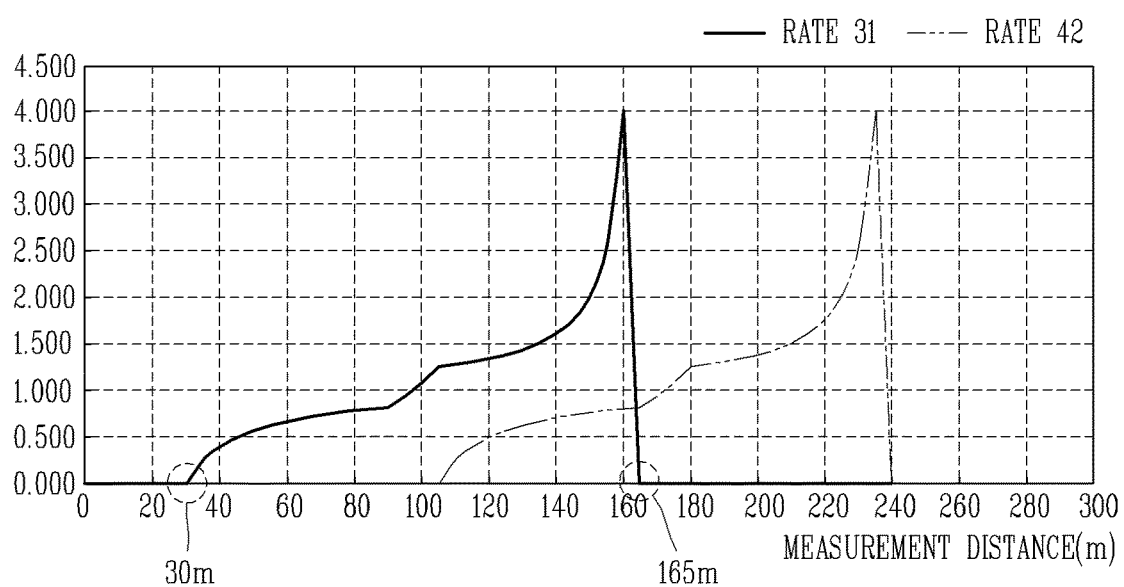
FIG. 4B is a view illustrating reference data relating to a brightness ratio according to a distance.

FIG. 4A is a graph showing a quantity of light according to a distance for comparing a quantity of light of first and third light receiving patterns with a quantity of light of second and fourth light receiving patterns, and FIG. 4B is a view illustrating reference data relating to a brightness ratio according to a distance.

Referring to FIG. 4B, a brightness ratio obtained by dividing a quantity of light received by the third light receiving pattern by a quantity of light received by the first light receiving pattern, and a brightness ratio obtained by dividing a quantity of light received by the fourth light receiving pattern by a quantity of light received by the second light receiving pattern are shown in the graph according to a measurement distance.

It is possible to acquire more accurate distance data of an object located at a distance where a brightness ratio by the first and third light receiving patterns and a brightness ratio by the second and fourth light receiving patterns coexist. In addition, distance data of an object located at a distance from about 30 m to about 105 m and distance data of an object located at a distance from about 165 m to about 240 m may be calculated by the brightness ratio by the first and third light receiving patterns and the brightness ratio by the second and fourth light receiving patterns, respectively.

That is, more accurate distance data of objects located at far distances can be acquired by controlling the image sensor to be activated by the second and fourth light receiving patterns having delay times different from delay times of the first and third light receiving patterns even without extending the output time width of the pulsed light.

Figure 5:
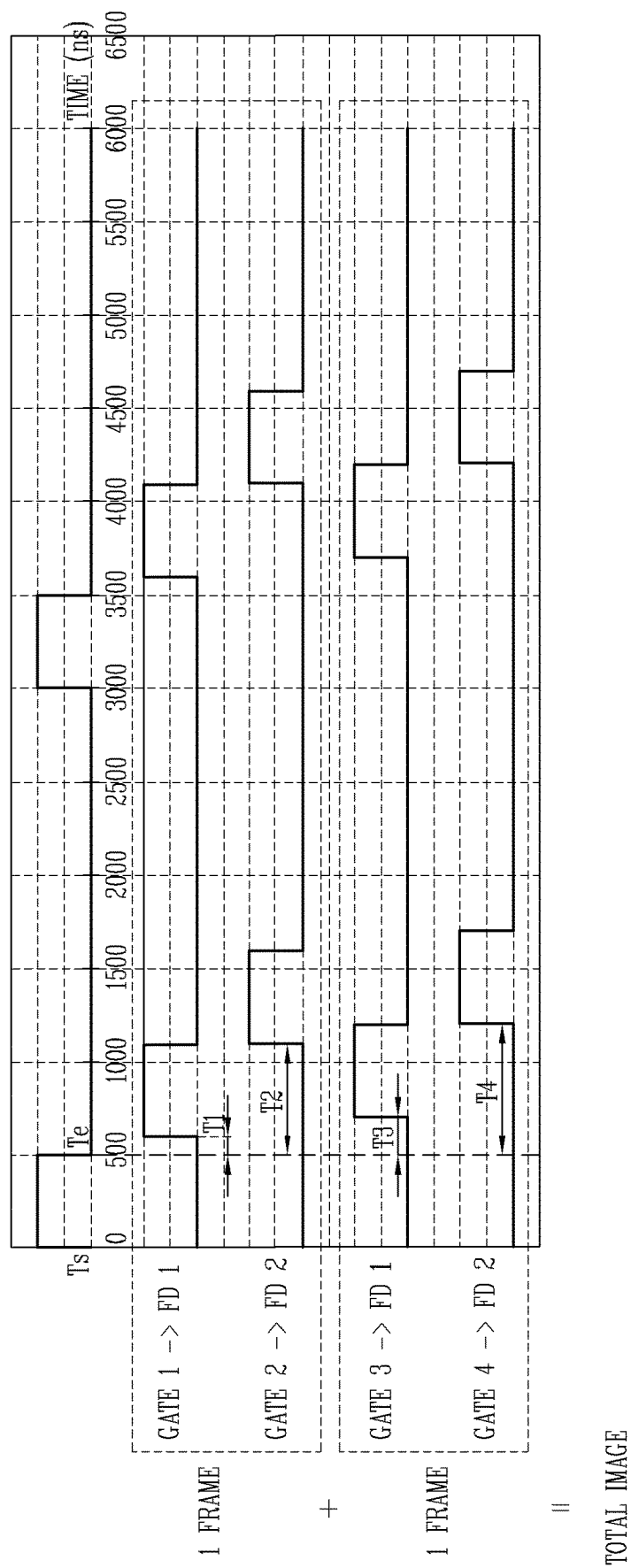
FIG. 5 is a conceptual view illustrating a control method when two image sensors are included according to another embodiment.

FIG. 5 is a conceptual view illustrating a control method when two image sensors are included according to another embodiment.

A night vision display device of FIG. 5 may include two image sensors, and the two image sensors may be a TOF sensor. While an optical pulse is output from the optical pulse output unit 110 at a specific period and a specific time width, the two image sensors receive reflected light in a manner of having different delay times.

The first image sensor receives light to have a first delay time t1, and at the same time, the second image sensor receives light to have a second delay time t2. A first frame is made of images formed from the first and second image sensors.

When the first frame passes, that is, after outputting pulsed light a predetermined number of times, namely, according to the change in the output start time point, the first image sensor receives light reflected to have a third delay time t3, and the second image sensor receives light reflected to have a fourth delay time t4. The first and second image sensors form a second frame which is next to the first frame. Distance data according to a brightness ratio is generated based on changes in light quantity included in the first and second frames.

The control unit 180 generates distance data according to a brightness ratio collected while making the first and third delay times t1 and t3 and generates distance data according to a brightness ratio collected while making the second and fourth delay times t2 and t4.

The light quantity changes collected by the first image sensor are stored in a first memory, and the light quantity changes collected by the second image sensor are stored in a second memory. That is, they are stored in different memories.

The control unit 300 controls the first image sensor to receive light with the first delay time t1 or the third delay time t3 and controls the second image sensor to receive light with the second delay time t2 or the fourth delay time t4.

Accordingly, distance data within a specific rage can be acquired even when a TOF sensor which cannot change a delay time in one frame is used. One image is formed by images obtained by the first and second frames.

Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. A night vision display device, comprising:
an image sensor configured to receive pulsed light output at a specific period and form a plurality of images using pulsed light reflected by an external object;
a display configured to output a final image obtained by synthesizing the plurality of images from the image sensor; and
a controller operably connected with the image sensor and the display, and configured to calculate distance information related to an object displayed in each pixel by using data related to a brightness ratio of each pixel of the final image and a brightness ratio for a distance,
wherein the controller is further configured to:
control the image sensor to be activated with different delay times based on an output end time of the pulsed light in one frame, and
control the image sensor to receive light with first to fourth delay times in one frame,
wherein the image sensor have activation time widths, differently set, when the image sensor is activated to have the first and third delay times, and
wherein a position corresponding to last light received when the image sensor has the first delay time is closer to the image sensor than a position corresponding to last light received when the image sensor has the third delay time.

2. The device of claim 1, wherein the different delay times are set in a manner that time widths for activating the image sensor with respect to an output time width of the pulsed light overlap each other.

3. The device of claim 2, wherein the distance information is calculated according to a brightness ratio of light received for the overlapped time width of the image sensor with respect to the output time width of the pulsed light.

4. The device of claim 1,
wherein the first to fourth delay times are sequentially increased in an order of the first delay time, the third delay time, the second delay time, and the fourth delay time.

5. The device of claim 1, wherein the controller calculates distance data using a brightness ratio of light received with the first and third delay times and data of the brightness ratio, and calculates distance data using a brightness ratio of light received with the second and fourth delay times and data of the brightness ratio.

6. A night vision display device, comprising:
an image sensor configured to receive pulsed light output at a specific period and form a plurality of images using pulsed light reflected b an external object,
a display configured to output a final image obtained by synthesizing the plurality of images from the image sensor; and
a controller operably connected with the image sensor and the display and configured to calculate distance information related to an object displayed in each pixel by using data related to a brightness ratio of each pixel of the final image and a brightness ratio for a distance,
wherein the controller is further configured to:
control the image sensor to be activated with different delay times based on an output end time of the pulsed light in one frame, and
control the image sensor to receive light with first to fourth delay times in one frame, and
wherein the difference between the first and third delay times is set in a manner that a position where light received with the third delay time is received first is located between a position where light received with the first delay time is received first and a position where the light received with the first delay time is received last.

7. The device of claim 1, wherein an output time width of the pulsed light is equal to an activation time width of the image sensor.

8. The device of claim 1, wherein the image sensor is configured as a gated image sensor.

9. The device of claim 1, wherein the image sensor includes first and second image sensors configured as a time of flight (TOF) image sensor, and
wherein the controller controls the first and second image sensors to simultaneously receive light with first and third delay times, respectively, during a first frame, and controls the first and second image sensors to simultaneously receive light with second and fourth delay times during a second frame.

10. The device of claim 9, wherein the controller forms one image using images obtained during the first and second frames.

11. The device of claim 9, wherein the first to fourth delay times are sequentially increased in an order of the first delay time, the third delay time, the second delay time, and the fourth delay time.

* * * * *